United States Patent [19]
Swan et al.

[11] Patent Number: 6,058,074
[45] Date of Patent: May 2, 2000

[54] METHOD AND SYSTEM FOR DETECTING HYDROCARBON RESERVOIRS USING AMPLITUDE-VERSUS-OFFSET ANALYSIS WITH IMPROVED MEASUREMENT OF BACKGROUND STATISTICS

[75] Inventors: Herbert W. Swan, Richardson, Tex.; Bruce J. Verwest, Pryford, United Kingdom

[73] Assignee: Atlantic Richfield Company, Los Angeles, Calif.

[21] Appl. No.: 09/127,326

[22] Filed: Jul. 31, 1998

[51] Int. Cl.[7] ..................................................... G01V 1/36
[52] U.S. Cl. ................................ 367/38; 367/47; 367/21; 367/52
[58] Field of Search .................................. 367/61, 47, 38, 367/21, 52

[56] References Cited

U.S. PATENT DOCUMENTS

| | | | |
|---|---|---|---|
| 4,479,204 | 10/1984 | Silverman | 367/47 |
| 5,001,677 | 3/1991 | Masters | 367/68 |
| 5,440,525 | 8/1995 | Dey-Sarkar et al. | 367/52 |
| 5,453,958 | 9/1995 | Neff | 367/70 |
| 5,515,335 | 5/1996 | Swan | 367/47 |
| 5,661,697 | 8/1997 | Swan et al. | 367/47 |
| 5,784,334 | 7/1998 | Sena et al. | 367/47 |

OTHER PUBLICATIONS

Swan, "Properties of direct AVO hydrocarbon indicators", *Offset–dependent reflectivity—Theory and Practice of AVO analysis* (Castagna, J.P. & Backus, M.M., eds., Soc. Expl. Geophys., 1993), pp. 78–92.

Castagna and Swan, "Principles of AVO crossplotting", *The Leading Edge* (Apr. 1997), pp. 337–342.

Castagna, Swan, and Foster, "Framework for AVO gradient and intercept interpretation", *Geophysics*, vol. 63, No. 3, (May–Jun. 1998), pp. 948–956.

*Primary Examiner*—Christine Oda
*Assistant Examiner*—Anthony Jolly
*Attorney, Agent, or Firm*—Anderson, Levine & Lintel

[57] ABSTRACT

A computer system and method of operating the same to apply overburden corrections to seismic signals prior to amplitude-versus-offset (AVO) analysis is disclosed. The system and method retrieve common midpoint gathers of the seismic signals, and generate analytical, or complex, AVO intercept and AVO slope traces therefrom, effectively stacking the traces in each gather. Over a sliding time window of the stacks, the computer system generates p-measure standard deviation and correlation statistics, preferably using a p-measure value less than one. The AVO intercept and AVO slope traces are then modified, at each depth point of interest corresponding to a time window placement, according to the relationship between the p-measure statistics and the desired statistics for the background distribution. Conformance of the background statistics to known values can be achieved, thus eliminating offset-dependent contamination of the AVO data; this is accomplished with minimal influence from AVO anomalous points, improving the sensitivity and accuracy with which petrophysically-interesting strata may be detected from AVO traces.

20 Claims, 8 Drawing Sheets

METHOD AND SYSTEM FOR DETECTING HYDROCARBON RESERVOIRS USING AMPLITUDE-VERSUS-OFFSET ANALYSIS WITH IMPROVED MEASUREMENT OF BACKGROUND STATISTICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of seismic prospecting for oil and gas reserves, and is more specifically directed to such prospecting utilizing amplitude-versus-offset analysis in seismic surveys.

The use of seismic surveys in the search for oil and gas reservoirs is commonplace. As is rudimentary in the art, seismic surveys are performed by imparting acoustic energy of a known amplitude and frequency pattern at one or more locations of the earth (either at a land surface or in a marine environment), and then detecting reflected and refracted acoustic energy at other locations. The delay time between the imparting of the acoustic energy at the source location and detection of the same wave at a receiver location is indicative of the depth at which a particular reflecting geological interface is located. The field of seismic data analysis is concerned with techniques for analyzing the detected acoustic energy to determine both the location and also the properties of various geological strata.

A known technique in the generation and analysis of conventional seismic surveys is referred to as amplitude-versus-offset ("AVO") analysis. According to the AVO approach, attributes of a subsurface interface are determined both from the normal-incidence amplitude of reflected seismic energy and also from the dependence of the detected seismic reflections on the angle of incidence of the energy. According to conventional AVO analysis, multiple seismic traces (i.e., time-domain signals at different detection locations) that include a signal from a common reflection point are collected into a common-depth point (CDP) gather. Typically, a series of common reflection points for the same source-receiver pairs underlie the same surface location at the midpoint between the source and receiver for multiple offsets; as such, this gather is also often referred to as a common midpoint (SAP) gather. The amplitude R of a reflected seismic wave from an interface (i.e., the "target horizon"), as a function of the angle of incidence θ from the normal, varies within a CMP gather according to the following relationship:

$$R(\theta) = A + B\sin^2\theta$$

In this case, the coefficient A is the zero-offset response (also referred to as the AVO intercept), while the coefficient B is referred to as the AVO slope, or gradient, as it is representative of the rate of change of amplitude with the square of the angle of incidence.

For a given reflection event from a horizon between two geological formations, the values of A and B will depend upon the physical properties of the two formations. The well-known Zoeppritz equations provide closed form equations for the response $R(\theta)$ based upon the compressional velocities ($V_P$), shear velocities ($V_S$), and densities ($\rho$) of the two formations at the reflecting interface. However, inversion of the Zoeppritz equations to solve for the elastic properties of the formations from reflection data is impractical, due to numerical complexity.

By way of further background, the calculation of theoretical values for A and B for isolated rock interfaces (i.e., at specific horizons) through the use of the linearized Zoeppritz equations and based upon typical values for compressional velocity, density and Poisson's ratio for the strata on either side of the interface of interest, is described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92. As described therein, variations in the A and B values for particular interfaces from a theoretical A-versus-B trend line for the expected stratigraphic sequences can indicate the location of interfaces in the survey. These variations have resulted in the generation of various "indicators" by way of which anomalous points in the AVO survey (anomalous relative to the background AVO behavior) may be identified. Depending upon the indicator, the anomalous AVO points can be used to specifically identify hydrocarbon-bearing formations in the earth. Examples of AVO seismic survey methods that are based upon the generation of AVO indicators are described in U.S. Pat. No. 5,661,697, and in copending applications Ser. No. 08/614,744, filed Mar. 13, 1996 and Ser. No. 08/654,258, filed May 28, 1996, all of which are commonly assigned herewith and incorporated hereinto by this reference.

However, it has been observed that certain variations in the portion of the earth being surveyed can contaminate the AVO analysis, by inserting offset-dependent variations in the seismic energy that are not due to the presence (or absence) of hydrocarbons. For example, overburden layers have been observed to cause variations in the AVO information. Accordingly, as described in U.S. Pat. No. 5,515,335, commonly assigned herewith and incorporated herein by this reference, it is desirable to modify the AVO behavior of the background points (i.e., points in the AVO traces that are not anomalous, in the surveying sense) so as to eliminate contamination from these offset-dependent effects. This approach measures the standard deviations and correlation coefficient of the AVO intercept (A) and AVO slope (B) within windows (varying in time and CMP location), and then adjusts the AVO intercept (A) and AVO slope (B) values within this window so that the adjusted AVO traces have standard deviations and correlation matching a "desired" set of statistics. According to this approach, the "background" behavior of the AVO data over the survey region is made uniform, and is thus independent of overburden effects and other offset-dependent contamination.

While the method of correcting for overburden described in the above-incorporated U.S. Pat. No. 5,515,335 is useful in many surveys, it has been observed, in connection with the present invention, that this correction approach has limitations, particularly in certain geological formations. As noted above, the overburden correction process is intended to adjust the AVO data only for the background data, and ought not affect the anomalous AVO points, which are interesting from a prospecting standpoint due to their different AVO intercept (A) and AVO slope (B) values (or indicator values) from the background. Indeed, it has been observed, in connection with the present invention, that application of the overburden correction of U.S. Pat. No. 5,515,335 has modified the AVO intercept (A) and AVO slope (B) values for the anomalous points in such a way as to render these points less indicative in the prospecting sense. In some cases, as will now be described relative to FIGS. 1a and 1b, the overburden correction has modified the anomalous points to such an extent as to change their classification.

FIG. 1a illustrates an AVO plot of points within a sizable window of seismic signal data in a survey. In this example, a window of seismic traces covering 200 CMPs and 700 msec in time was analyzed according to conventional methods so that each sample point in the window was assigned an AVO intercept (A) value and an AVO slope (B) value. FIG. 1a is a cross-plot of the AVO intercept (A) and AVO slope (B) values for these points in the window, after normalization of the AVO slope (B) values to have substantially the same statistical range as the AVO intercept (A) values; this normalization does not affect the correlation or other statistics used in the modification for elimination of overburden effects.

In FIG. 1a, the background distribution of AVO intercept (A) and AVO slope (B) values is evident near the origin of the cross-plot, and indicated by the intense distribution thereat (i.e., the white region). This background tends to have a negative correlation between the AVO intercept (A) and AVO slope (B) values, as evident from the slope of the distribution extending into the second and fourth quadrants (QII, QIV, respectively) of the cross-plot. In contrast, certain anomalous points are also evident in the cross-plot of FIG. 1a. These anomalous points tend to have a positive correlation between the AVO intercept (A) and AVO slope (B) values. Examples of specific anomalous points illustrated in FIG. 1a include point C3 in quadrant QIII, which corresponds to a Class III anomaly, and point C4 along the negative A axis, which corresponds to a Class IV anomaly. As is known in the art, a Class III AVO anomaly such as point C3 (i.e., an outlying point in quadrant QIII) indicates the possible presence of a low impedance gas sand below a low impedance shale, while a Class IV AVO anomaly such as point C4 (i.e., an outlying point near the negative A axis) indicates the possible presence of a low impedance gas sand below a high impedance shale. Further background regarding the classification of AVO anomalies is provided in Castagna and Swan, "Principles of AVO crossplotting", *The Leading Edge* (April, 1997), pp. 337–342; and in Castagna, Swan, and Foster, "Framework for AVO gradient and intercept interpretation", *Geophysics*, Vol. 63, No. 3 (May–June, 1998), pp. 948–956, both incorporated hereinto by this reference. Anomalies such as points C3, C4 are thus interesting from a seismic prospecting standpoint, because their AVO characteristics are indicative of certain geological formations that relate to hydrocarbon reserves.

As discussed above, however, modification of the AVO intercept (A) and AVO slope (B) values or traces in an AVO survey is useful to eliminate offset-dependent signal contamination such as those due to overburden effects. As described in U.S. Pat. No. 5,515,335, a known technique for eliminating such effects matches the correlation coefficients between the AVO intercept (A) and AVO slope (B) values over multiple windows in the seismic survey, such that the background statistics (against which possible anomalous points are measured) are uniform over the seismic section. If these background statistics are not made uniform, the identification of important anomalous points becomes difficult, as a point may have a significant hydrocarbon indicator (i.e., indicative of an important feature) in one portion of the seismic section, but may become part of the background in another portion of the seismic section. In other words, uniformity in the background statistics over the seismic section allows important anomalies to be identified in each portion of the seismic section, without generating a large number of false positives in any portion of the section (e.g., portions having a low correlation between the AVO intercept (A) and AVO slope (B) values).

Conventional techniques for matching the background statistics over the section, such techniques as described in U.S. Pat. No. 5,515,335, utilize the so-called L2 statistics to modify the AVO intercept (A) and AVO slope (B) traces in the survey. An example of the determination and use of the L2 statistics for a group of points in A-B space is described in the above-incorporated U.S. Pat. No. 5,515,335. According to this approach, a digital computer determines the amplitude standard deviations $\sigma_a$, $\sigma_b$, and also the correlation coefficient r of the AVO intercept (A) and AVO slope (B) values of A and B for each depth point in the window under analysis. These calculations are preferably made using complex, or analytical, traces $A_c(t)$, $B_c(t)$ for each surface location, generated as the sum of real traces for the A and B values over time (i.e., A(t), B(t), respectively) and the square root of −1 times their respective Hilbert transform. The standard deviations $\sigma_a$, $\sigma_b$ are estimated according to the following equations:

$$\sigma_a = \frac{\sqrt{\sum_{i=1}^{n} |A_c(i)|^2}}{n}$$

$$\sigma_b = \frac{\sqrt{\sum_{i=1}^{n} |B_c(i)|^2}}{n}$$

where the index i refers to the $i^{th}$ depth point within window $W_i$, where $|A_c(i)|$ and $|B_c(i)|$ are the magnitudes of the analytical trace coefficients at the $i^{th}$ depth point, and where n is the number of depth points i in each trace. If desired, a weighted averaging method may be used in the generation of these statistics, for example with the weighting decreasing toward zero at the edges of the window. The digital computer also determines a correlation coefficient r according to the following relationship:

$$r = \frac{1}{\sigma_a \sigma_b} \frac{\sum_{i=1}^{n} A_c(i) B_c^*(i)}{n}$$

where $B_c^*(i)$ is the value of the complex conjugate of the AVO slope $B_c$ at the $i^{th}$ depth point. Once these statistics are derived for the points within the current window, the digital computer may then determine whether the statistics are sufficiently well-behaved as to produce an accurate result; if not, the size of the analysis window may be adjusted.

As described in the above-incorporated U.S. Pat. No. 5,515,335, desired statistics $\sigma_a^d$, $\sigma_b^d$ and $r_d$ are selected based upon intuitive assumptions, or upon previous analysis of the portion of the earth being surveyed. The AVO intercept (A) and AVO slope (B) traces are then modified, based on these desired statistics, to render the background statistics uniform over the survey section. For example, modified AVO intercept traces $A_m(t)$ and modified AVO slope traces $B_m(t)$ may be generated as follows:

$$A_m(t) = \frac{\sigma_a^d}{\sigma_a} A_c(t)$$

$$B_m(t) = \sigma_b^d \left( \frac{B_c(t)}{\sigma_b} - r \frac{A_c(t)}{\sigma_a} \right) \sqrt{\frac{1 - r_d^2}{1 - |r|^2}} + \frac{\sigma_b^d}{\sigma_a} r_d A_c(t)$$

Typically, the desired standard deviations $\sigma_a^d$, $\sigma_b^d$ are simply equated to the estimated standard deviations $\sigma_a$, $\sigma_b$, in which case $A_m(t)$ simply equals the original analytical trace $A_c(t)$. However, the modified AVO slope trace $B_m(t)$ is both scaled and translated, according to the corresponding AVO intercept values $A_c(t)$, as well as the desired and actual statistics.

However, it has been observed, in connection with the present invention, that this operation of matching of the statistics of the seismic section windows to the desired statistics can change the AVO intercept (A) and AVO slope (B) values of anomalous points to such an extent that their character as outliers can change. FIG. 1b is a cross-plot of the points of FIG. 1a, after modification of the traces in the manner described above, to correspond to a desired correlation coefficient $r_d$ of −0.6. As evident from FIG. 1b, the background distribution of points (indicated by the high intensity region of the cross-plot near the origin) has narrowed and become more elongated, indicative of a more negative correlation coefficient. However, anomalous point C3 has moved toward the negative A axis, so as to now resemble a Class IV anomaly, rather than its true character as a Class III anomaly. Indeed, comparison of FIGS. 1a and 1b indicates that the quadrant QIII outliers of FIG. 1a have moved toward the background, with some moving into quadrant QIV. Additionally, Class IV anomaly point C4 of FIG. 1a has moved fully into quadrant QII of FIG. 1b as a result of the modification process, and is approaching the background trend. Accordingly, the process of modifying the AVO intercept (A) and AVO slope (B) traces to the desired correlation statistics, for purposes of eliminating contamination due to overburden and the like, has the undesired effect of moving anomalous points into the background. As a result, the conventional overburden correction process reduces the sensitivity of conventional AVO analysis in detecting true anomalous points that may be indicative of hydrocarbon-bearing formations.

By way of further background, techniques for the generation of statistics for each distribution within a population of jointly distributed variables, such as jointly Gaussian distributions, are known in the art. An example of such a technique is present within the MATHEMATICA 3.0 computer program, available from Wolfram Research.

BRIEF SUMMARY OF THE INVENTION

It is therefore an object of the present invention to provide a method and system of correcting AVO surveys for overburden and other offset-dependent effects while minimizing the effects from anomalous points in the survey.

It is a further object of the present invention to provide such a method and system that provides excellent corrections to background points in the AVO survey.

It is a further object of the present invention to provide such a method and system that may be readily performed by modern digital computing systems.

It is a further object of the present invention to provide such a method and system that may be readily adapted to existing seismic survey data.

Other objects and advantages of the present invention will be apparent to those of ordinary skill in the art having reference to the following specification together with its drawings.

The present invention may be implemented in a digital computer system, and method of operating the same, in which seismic survey signals obtained by conventional land or marine survey techniques are processed. According to the present invention, amplitude-versus-offset (AVO) analysis of the reflection events at each depth point is performed upon common depth point (CDP) gathers of the survey, to derive an AVO intercept value A and an AVO gradient value B for each depth point. The A and B coefficient traces are retrieved for each depth point in a window of the survey section surrounding a depth point of interest, and corresponding to several adjacent surface locations over a selected time range thereabout. In each window, scale factors are generated for the A and B values, and these scale factors are normalized using a p-measure to generate standard deviations of the A and B values over the window. The A and B values are then scaled for each point in the window using the scale factors, and a second set of scale factors, again using the p-measure, are then generated from the scaled A and B values, to produce a correlation coefficient The A and B values for the depth point of interest are then modified according to the relationship between desired statistics and those calculated according to the method, to provide overburden correction thereto prior to generation of the desired AVO indicator. The time and space window is then shifted to each depth point of interest in the survey, and the process is repeated until the survey section is completely corrected.

BRIEF DESCRIPTION OF THE SEVERAL VIEWS OF THE DRAWING

FIGS. 1a and 1b are amplitude-versus-offset (AVO) cross-plots of AVO intercept and AVO slope values for a selected time and location window of a conventional seismic survey, in which the cross-plot of FIG. 1b illustrates the effects of conventional overburden correction applied to the cross-plot of FIG. 1a.

DETAILED DESCRIPTION OF THE INVENTION

Figure 2:
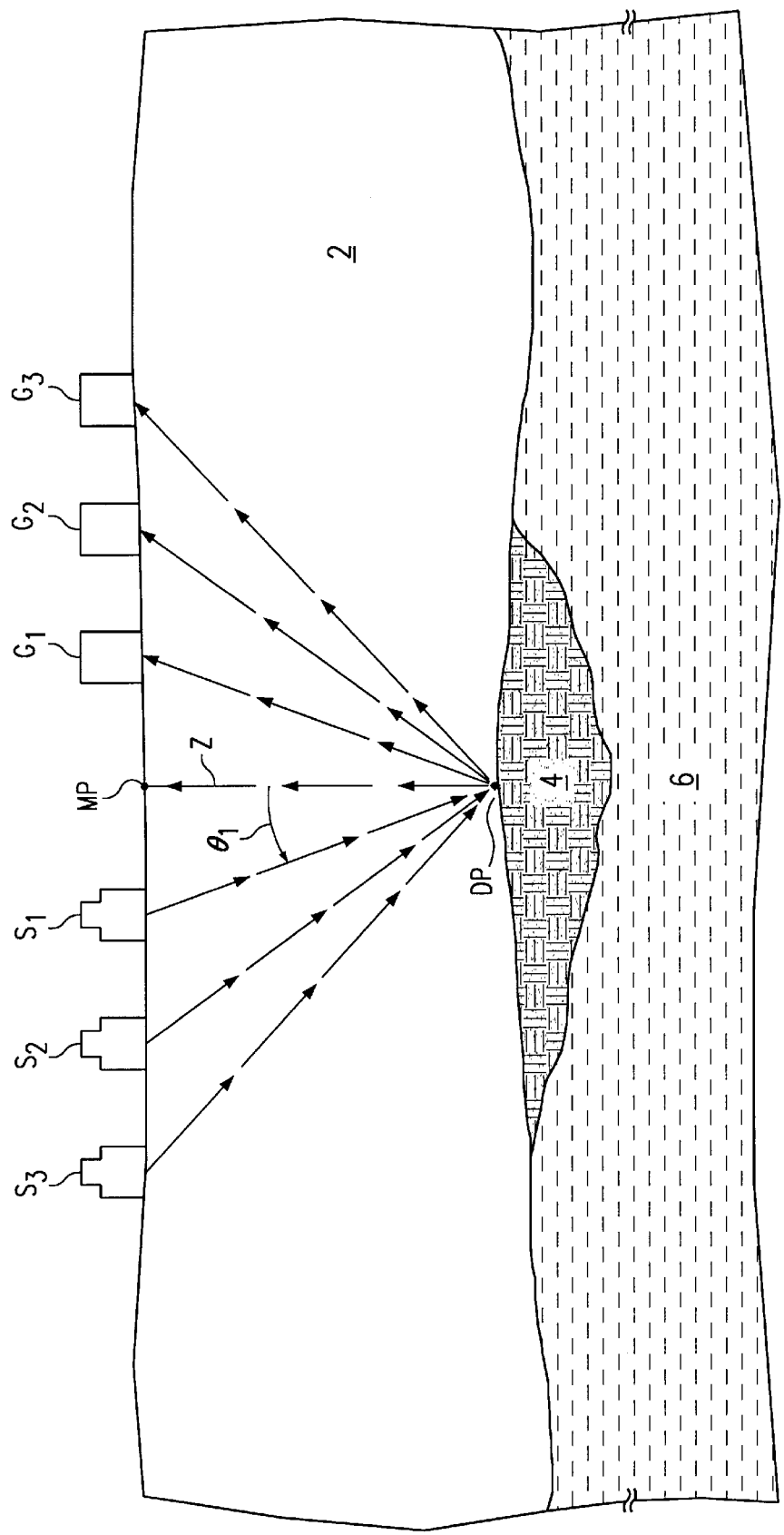
FIG. 2 is a cross-sectional view of a portion of the earth illustrating a single depth point in a seismic survey from which multiple seismic waves are reflected.

Referring first to FIG. 2, a seismic survey with which the preferred embodiment of the invention is useful will first be described for the example of a single depth point DP, in a land-based survey, present at a horizon between formations 2,4. While the survey of FIG. 2 is a land-based survey, it will of course be appreciated that the present invention is also applicable to marine surveys. Of course, the example of FIG. 2 will provide seismic signals for a multitude of depth points DP from which a seismic survey of either the two-dimensional or three-dimensional (2-D or 3-D) type may be generated. In the example of FIG. 2, depth point DP corresponds to the top surface of sand formation 4.

As is evident from FIG. 2, depth point DP in a seismic survey will reflect seismic energy from multiple source locations and detected by multiple receivers, such that the reflections travel from along multiple paths in the earth at varying angles of incidence. A zero-offset reflection is indicated by path Z between depth point DP and surface location MP that is directly above depth point DP. Seismic energy imparted by source $S_1$ is reflected from depth point DP and detected by geophone $G_1$; the angle of incidence $\theta_1$ is the angle of the path of energy from source $S_1$ from the vertical (i.e., from the zero-offset path). Similarly, energy imparted by sources $S_2$, $S_3$ is reflected from depth point DP and detected by geophones $G_2$, $G_3$, at increasing angles of incidence $\theta$ from the normal. Typically, the amplitude of the imparted seismic energy will vary with variations in the angle of incidence $\theta$. The variation in the amplitude of the energy with the angle of incidence $\theta$ is the basis of amplitude-versus-offset (AVO) seismic analysis techniques.

According to conventional AVO analysis, the relative amplitude of the reflected energy to the imparted energy as detected at the various geophone locations and extrapolated therefrom to zero offset (in effect estimating the reflected energy along vertical path Z from depth point DP to surface location MP) is referred to as the AVO intercept A for depth point DP. The AVO intercept value A may be either positive or negative, and ranges from −1 to 1. It is well known that, for typical real geological interfaces and at relatively small angles, the amplitude of reflected to imparted energy varies approximately linearly with the sine squared of the angle $\theta$; the slope of this angular dependence is commonly referred to as the AVO slope B. As such, in conventional AVO analysis, a given depth point DP, which underlies a specific midpoint and is at a specific depth, will have a single A value and a single B value, according to the relationship:

$$R(\theta)=A+B\sin^2\theta$$

Alternative models used in conventional AVO analysis may be used in connection with the present invention. For example, the reflected energy may be expressed as the following:

$$R(\theta)=A\cos^2\theta+B\sin^2\theta$$

In either case, the first and second coefficient values A, B, respectively, for depth point DP at the interface shown in FIG. 2, will depend upon the relative elastic properties of formations 2,4.

As noted above in the Background of the Invention, offset-dependent effects arising from causes other than those related to properties of the reflecting subsurface interfaces have been observed. One particular cause of such contaminating effects is the effect of overburden layers, which can absorb or reflect acoustic energy in an angle-dependent manner, and thus present offset-dependent attenuation of the seismic signals. These offset-dependent effects can swamp the true AVO information arising from the subsurface layers, and as such overburden correction methods for AVO surveys have been developed, such as described in the above-incorporated U.S. Pat. No. 5,515,335. However, as noted above in the Background of the Invention, for some regions of the earth, conventional overburden correction techniques have been observed to undesirably change the character of the anomalous points of interest, such as those due to hydrocarbon-bearing formations.

It has been observed, in connection with the present invention, that conventional overburden correction approaches are limited in their ability to accurately derive background statistics for a population that includes two distributions (i.e., the background and the anomalies). These conventional approaches result in erroneous modification of the AVO anomalies, particularly for survey sections where the anomalous population is on the order of at least ten percent of the total, as may occur in certain regions of the earth According to the present invention, the normalized AVO data gathered from a survey such as that illustrated in FIG. 2 is considered as a combination of two jointly Gaussian distributions: one distribution corresponds to the background of AVO intercept (A) and AVO slope (B) values for points in a time-space window of the survey section, while the other corresponds to the AVO anomalies, which potentially indicate hydrocarbon-bearing or other interesting formations. One may consider certain statistics of these jointly Gaussian distributions as follows:

$$\sigma_A^2 = \eta\sigma_{1A}^2 + (1-\eta)\sigma_{2A}^2$$

$$\sigma_B^2 = \eta\sigma_{1B}^2 + (1-\eta)\sigma_{2B}^2$$

where $\sigma_{1A}$, $\sigma_{1B}$, $\sigma_{2A}$, and $\sigma_{2B}$ are the standard deviations for the background A and B values and the anomaly A and B values, respectively, and where - is the fraction of the total population corresponding to the background points (the background being Distribution 1, and the anomalies being Distribution 2, in the jointly Gaussian population). One may then derive a correlation constant r from:

$$\sigma_A\sigma_B r = \eta\sigma_{1A}\sigma_{1B}r_1 + (1-\eta)\sigma_{2A}\sigma_{2B}r_2$$

Other statistics such as kurtosis may be similarly generated for this population.

Figure 1A:
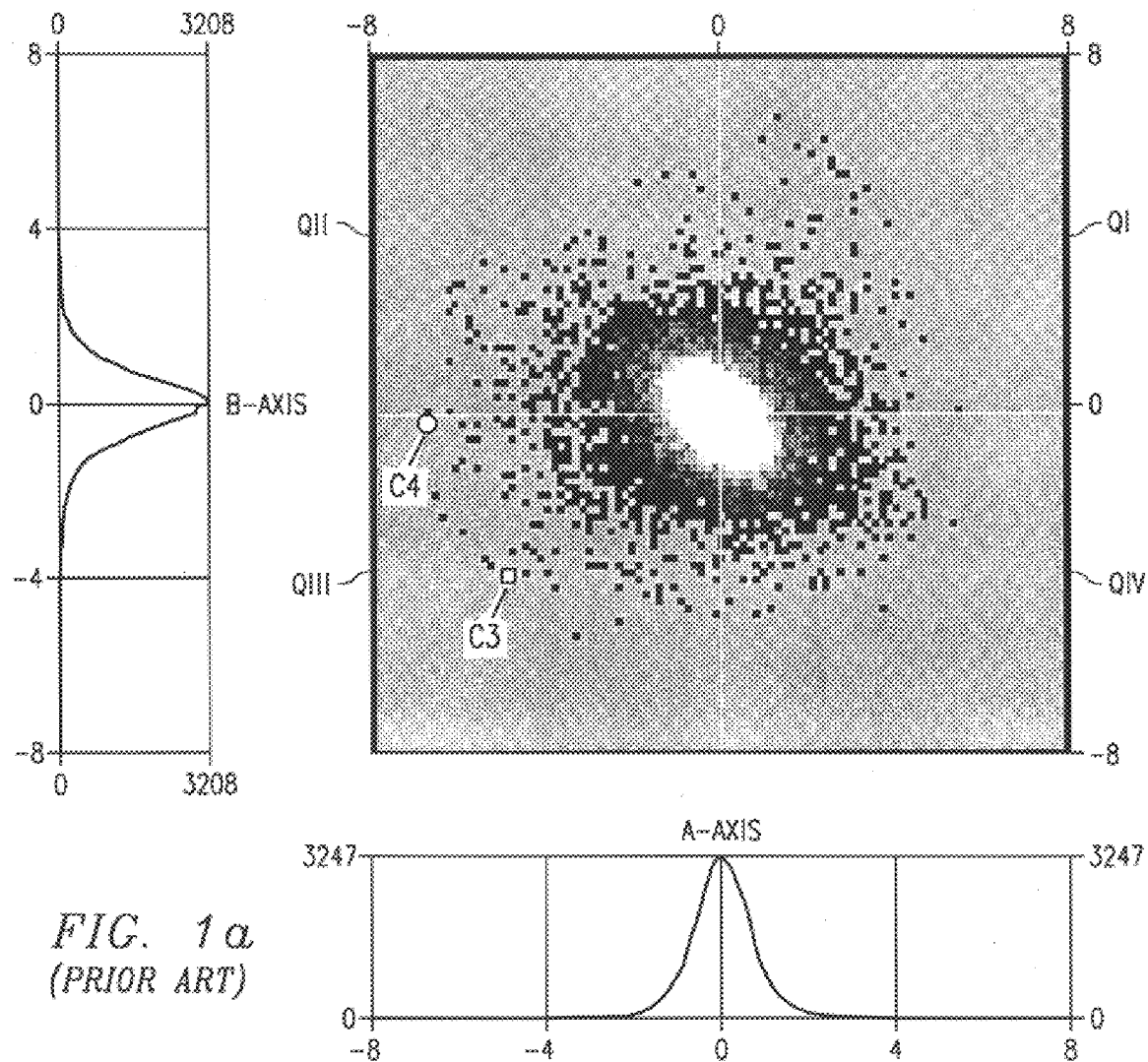
Figure 1B:
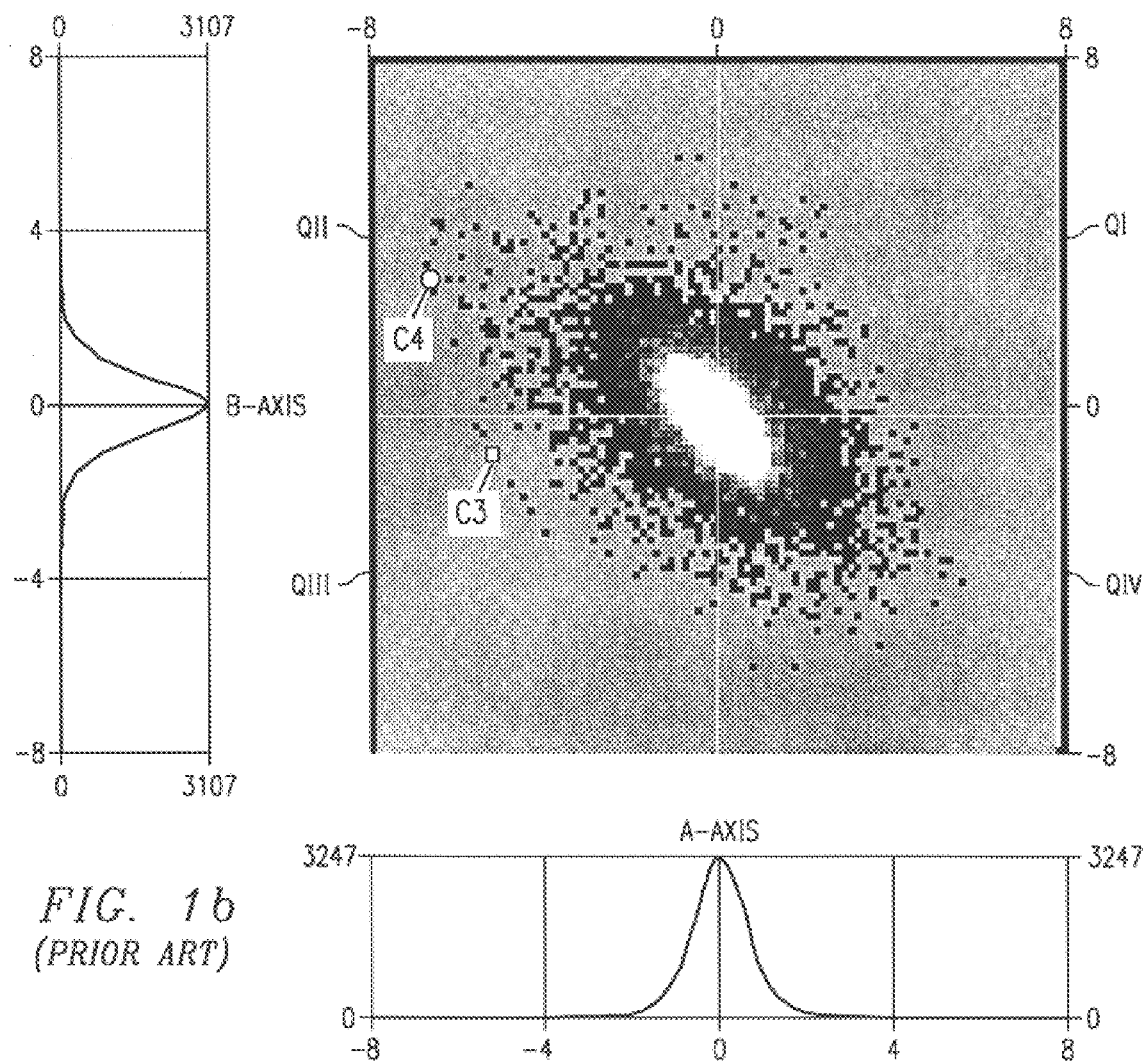
Figure 3A:
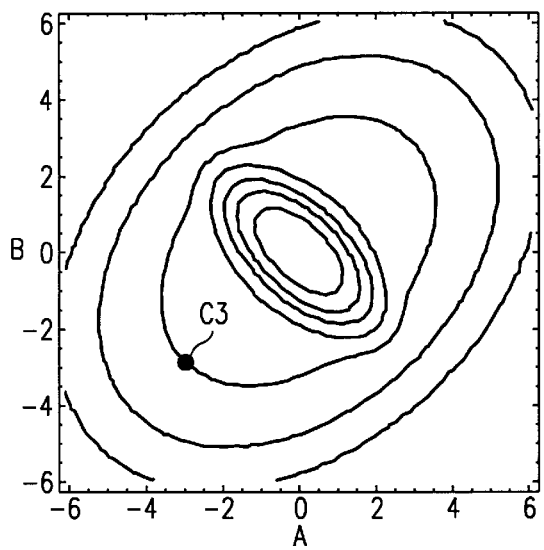
FIGS. 3a through 3c are probability contour plots corresponding to the populations of FIGS. 1a through 1c, respectively.
Figure 3B:
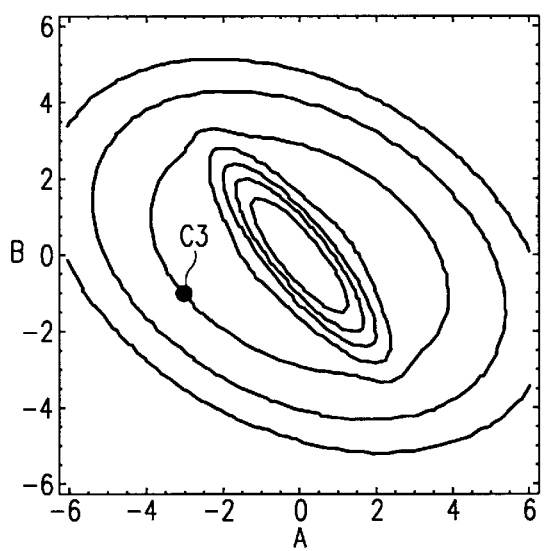

For the example of the normalized population that is cross-plotted in FIG. 1a, a contour plot, in A-B space, of this population is illustrated in FIG. 3a. The contours in FIG. 3a, from the origin outward, correspond to the 0.1, 0.03, 0.01, 0.003, 0.001, 0.0003, and 0.0001 probability levels. As illustrated in FIG. 3a, the probability contours for the background population (e.g., within the 0.003 probability contour), corresponding to Distribution 1 of the jointly Gaussian distribution, have a negative correlation coefficient behavior, while the lower probability contours, corresponding to outliers in the population and thus to Distribution 2 of the jointly Gaussian distribution, have a neutral or slightly positive correlation FIG. 3b illustrates the probability contours after the conventional overburden correction described above in the Background of the Invention, for a desired correlation coefficient of −0.6; as evident in FIG. 3b, the outlier population corresponding to Distribution 2 has been forced toward conformance with the background (Distribution 1), toward a negative correlation coefficient This change in the probability contours was observed, in connection with the present invention, to be the cause of an erroneous change of character of AVO anomalies (e.g., point C3 of FIGS. 1a, 1b, 3a, 3b). It has further been observed, in connection with the present invention, that the inaccuracies resulting from modification of the AVO anomalies by conventional overburden correction are exacerbated when the desired correlation coefficient is relatively large (e.g., about −0.7 and more negative).

As evident from the above description, offset-dependent interference affects both the background and the AVO anomalies, in the same manner. However, it is not possible to directly correct the AVO anomalies for these offset-dependent effects, because this interference also prevents accurate identification of the anomalies from the background. The preferred embodiment of the invention, which will be described in detail below, comprehends the jointly Gaussian distribution of the background and AVO anomalies in deriving the overburden corrections. Because of this comprehension, the background points in A-B space are modified to conform only their own statistics, and not the overall statistics including those of AVO anomalies, to those desired in eliminating offset-dependent effects such as those caused by overburden layers. According to the present invention, this same data transformation that causes the background statistics to comply to their expected values will also move the AVO anomalies to their proper position in A-B space, while also eliminating the interfering offset-dependent effects.

The detailed operation of the method and system for performing overburden correction according to the preferred embodiment of the invention will be described in further detail hereinbelow, relative to FIGS. 4 and 5, et seq. In summary, the preferred embodiment of the invention determines p-measure scale factors of the AVO intercept and slope traces within a selected time and space window, based upon a selected statistic thereof. Quantities corresponding to the AVO intercept values divided by the intercept scale factor, plus or minus the AVO slope values divided by the slope scale factor are then generated, which effectively scales the data so that the semi-major and semi-minor axes of the background distribution lie along 45 degree lines in A-B space. These quantities are themselves then scaled, again using a p-measure, and the ratio of the difference in these scales to the sum of these scales then provides the correlation coefficient, in effect, the correlation coefficient corresponds to the ratio of the lengths of the semi-major and semi-minor axes of the background distribution. By generating the correlation coefficient according to this approach, adjustment of the AVO signals to match desired background statistics has been found to minimize changes in the characteristics of AVO anomalies.

Figure 4:
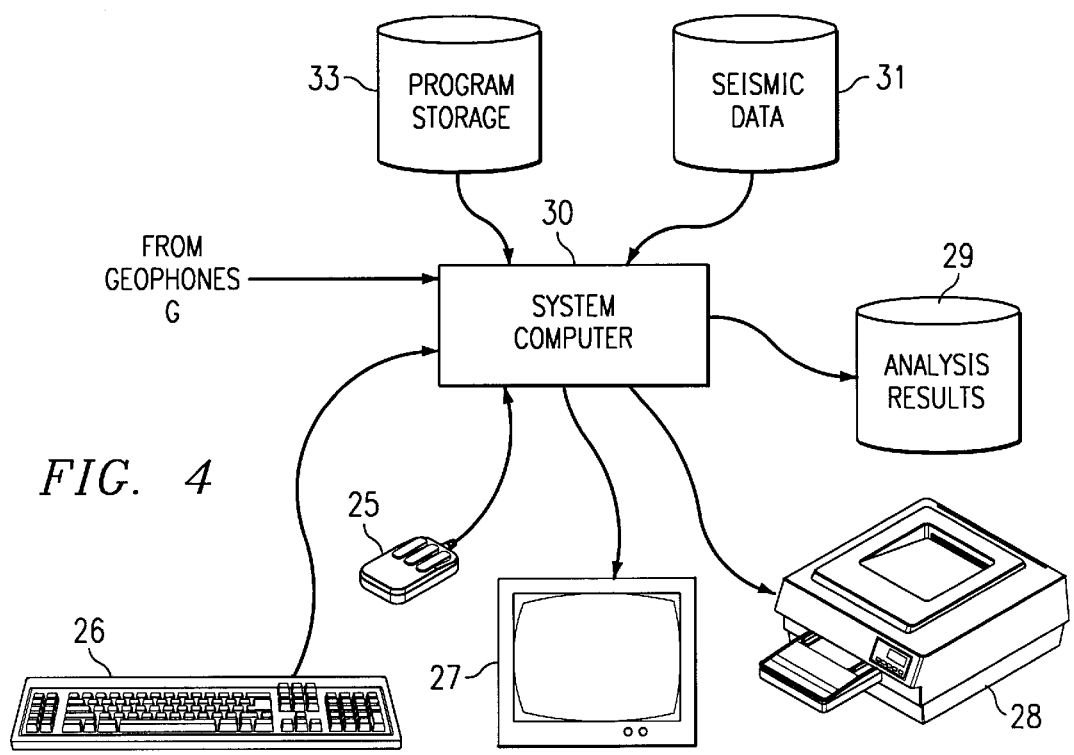
FIG. 4 is an electrical diagram, in block form, of a computer system for performing the preferred embodiment of the invention.

Referring now to FIG. 4, a computer system, into which the preferred embodiment of the invention may be implemented, will be described. This system includes system computer 30, which may be implemented as any conventional personal computer or workstation, preferably a UNIX-based workstation such as a SPARCstation available from Sun Microsystems, Inc., implemented either in standalone fashion, or as part of a network arrangement. System computer 30 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic data from geophones G is stored on disk storage device 31, from which system computer 30 may retrieve the appropriate data to perform the analysis described hereinbelow, according to program instructions that correspond to the method described hereinbelow. For operation on system computer 30, the program instructions are written in the form of a computer program (e.g., in C++ or in another suitable language) stored in computer-readable memory, such as program disk storage device 33 of FIG. 4; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 30 presents output primarily onto graphics display 27, or alternatively via printer 28; further in the alternative, system computer 30 may store the results of the analysis described hereinbelow on disk storage 29, for later use and further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

In the example of a land-based survey, as shown in FIG. 2, system computer 30 is in communication with geophones G (either directly or via a recording unit, not shown), to receive signals indicative of the reflected seismic energy received thereat in the survey. These signals, after conventional formatting and other initial processing, are stored by system computer as digital data in disk storage 31 for subsequent retrieval and processing in the manner described hereinbelow. While FIG. 4 illustrates disk storage 31 as directly connected to system computer 30, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 5:
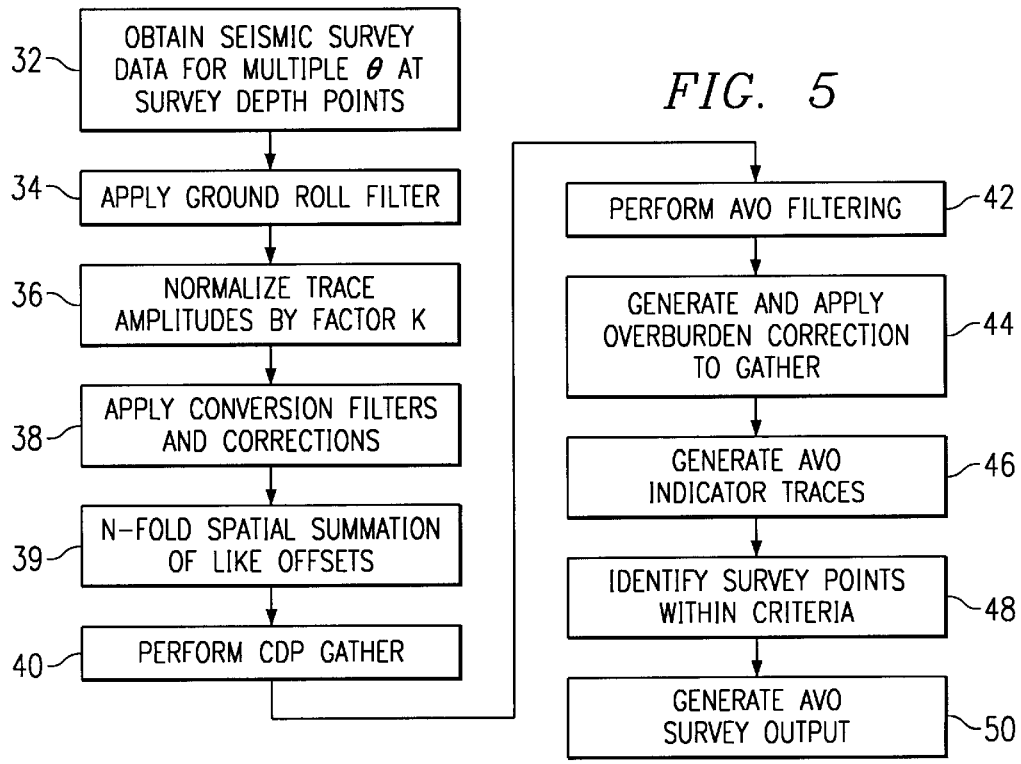
FIG. 5 is a generalized flow chart illustrating the process of analyzing AVO seismic data according to the preferred embodiment of the invention.

Referring now to FIG. 5, a method of analyzing the seismic signals detected by a plurality of seismic receivers, in order to discern the presence and location of potentially hydrocarbon bearing formations in the earth according to the preferred embodiment of the present invention, will now be described. The method of FIG. 5 may be implemented into and performed by the computer system of FIG. 4, and also by computers of other conventional architecture.

The method of the preferred embodiment of the invention begins, in process 32, with the obtaining of seismic data for a survey region having the desired attributes. For example, process 32 may be performed by obtaining a seismic survey over the region of interest by conventional techniques, such that each depth point of interest in the survey has seismic data corresponding to multiple offsets and thus multiple angles of incidence. The maximum angle of incidence that will provide useful data for the preferred embodiment of the invention is contemplated to be around 40° from the normal, and the maximum frequency of the seismic energy should be at least 85 Hz to provide useful seismic resolution. The seismic data obtained in process 32 preferably has all shot and receiver gathers cross-correlated with one another, such that a consistent statics solution may be obtained. The seismic data obtained in process 32 may come from either a newly performed survey or, alternatively, may use data from existing surveys that meet the above requirements. Referring to FIG. 4, process 32 is completed by system computer 30 storing the obtained seismic data in disk storage 31 for later retrieval.

Process 34 is next performed, in which system computer 30 performs ground roll filtering upon the seismic data that was obtained and stored in disk storage 31 in process 32. The ground roll filtering performed in process 34 is preferably done by the application of a conventional 3D fan filter; preferably, this fan filter should take into account the irregular 3D geometry with which the seismic data are collected. Such filtering is readily performed by system computer 30, according to conventional digital filtering techniques. As a result of process 34, ground roll noise in the originally obtained seismic data is attenuated.

Process 36 is next performed by system computer 30, to normalize the individual traces in the seismic survey. This normalization of amplitudes of the seismic signals is highly desirable, especially in land-based surveys, so that variations in coupling to the earth and in near-surface properties among the various geophones G may be eliminated from the seismic data to be analyzed according to the preferred embodiment of the invention. As discussed above, this normalization conforms the relative range of the A and B values to one another. The normalization of process 36 may depend upon the particular AVO indicator used in the survey. For example, as described in the above-referenced U.S. Pat. No. 5,661,697, in which the slope deviation $\Delta B$ (i.e., the slope B at each depth point relative to the slope B for other depth points in the survey) is used as an AVO indicator, the normalization of process 36 applies a normalization factor K to each trace that corresponds to the $p^{th}$ root of the integral of the $p^{th}$ power of the trace over a time window of analysis. The exponent p is selected according to the type of normalization desired, with root-mean-square normalization using p=2, and absolute amplitude normalization using p=1.

Following the normalization of process 36, system computer 30 then performs conventional seismic processing filtering and correction in process 38, to the extent desired by the analyst These conventional procedures include, for the case of the 3-D survey, solution of 3-D refraction statics, attenuation of 3-D linear noise, application of 3-D surface-consistent statics, 3-D dip moveout, 3-D prestack time migration, and the like. For either 2-D or 3-D surveys, process 38 may include radon transform multiples rejection, surface-consistent deconvolution, automated trace editing, zero phase tie of the seismic data to well control, and normal moveout correction. It is contemplated that one of skill in the art will be readily able to apply the desired filters and corrections indicated by process 38.

Despite the operation of process 38, it has been discovered that signal-to-noise ratio for the normalized seismic data may not be adequate to provide useful data for the AVO analysis according to the preferred embodiment of the invention. As such, according to the preferred embodiment of the invention, system computer 30 performs process 39, in which spatial summation of multiple points in each trace surrounding the trace point is performed, to further improve the signal-to-noise ratio. A preferred type of spatial summing process 39 is described in the above-incorporated U.S. Pat. No. 5,661,697.

According to this preferred embodiment of the invention, processes 32 through 39 described hereinabove were performed upon retrieved seismic survey data in the shot-point gather domain. As shown in FIG. 5, process 40 next performs common depth point (CDP) gathers of the traces after process 39. While processes 38, 39, 40 are shown in FIG. 5 as being in a specific order, it is of course to be understood that the specific order in which these processes are performed is not of particular importance, so long as processes 38, 39, if performed following CDP gather process 40, contemplate operation in the CDP gather domain, rather than in the shot-point gather domain.

Amplitude-versus-offset (AVO) filter process 42 is then performed by system computer 30 upon each gather generated process 40, to eliminate the effects of offset-dependent tuning which is often present in areas that contain hard-rock (or indurated) formations. A detailed description of the operation of process 42 is provided in the above-incorporated U.S. Pat. No. 5,661,697. By way of summary, process 42 according to the preferred embodiment of the invention generates, for each gather in the survey, estimated AVO traces $\hat{A}(t)$, $\hat{B}(t)$ that are based upon a least-squares fit of the raw AVO intercept and slope traces $\hat{A}(t)$, $\hat{B}(t)$ over the traces in the gather, to which filtering, such as by way of a minimum mean-squared error filter, is then applied. These estimated AVO traces $\hat{A}(t)$, $\hat{B}(t)$ are thus effectively "stacks" of the individual AVO traces $A(t)$, $B(t)$ in the gather; as noted above, however, these stacks are preferably more than a simple summation of traces (in the CDP stack sense), and are instead based upon some type of curve-fitting stack in combination with filter processing. Of course, other approaches to processing the AVO data may alternatively be applied, depending upon the AVO indicators to be developed and upon the desired filtering effects.

According to the preferred embodiment of the invention, system computer 30 next performs process 44, by way of which overburden correction is applied to the estimated "stacked" AVO traces in the survey. The survey, at this point in time, corresponds to a pair of estimated AVO traces $\hat{A}(t)$, $\hat{B}(t)$ associated with each common depth-point or common-midpoint location in the survey section.

Figure 6:
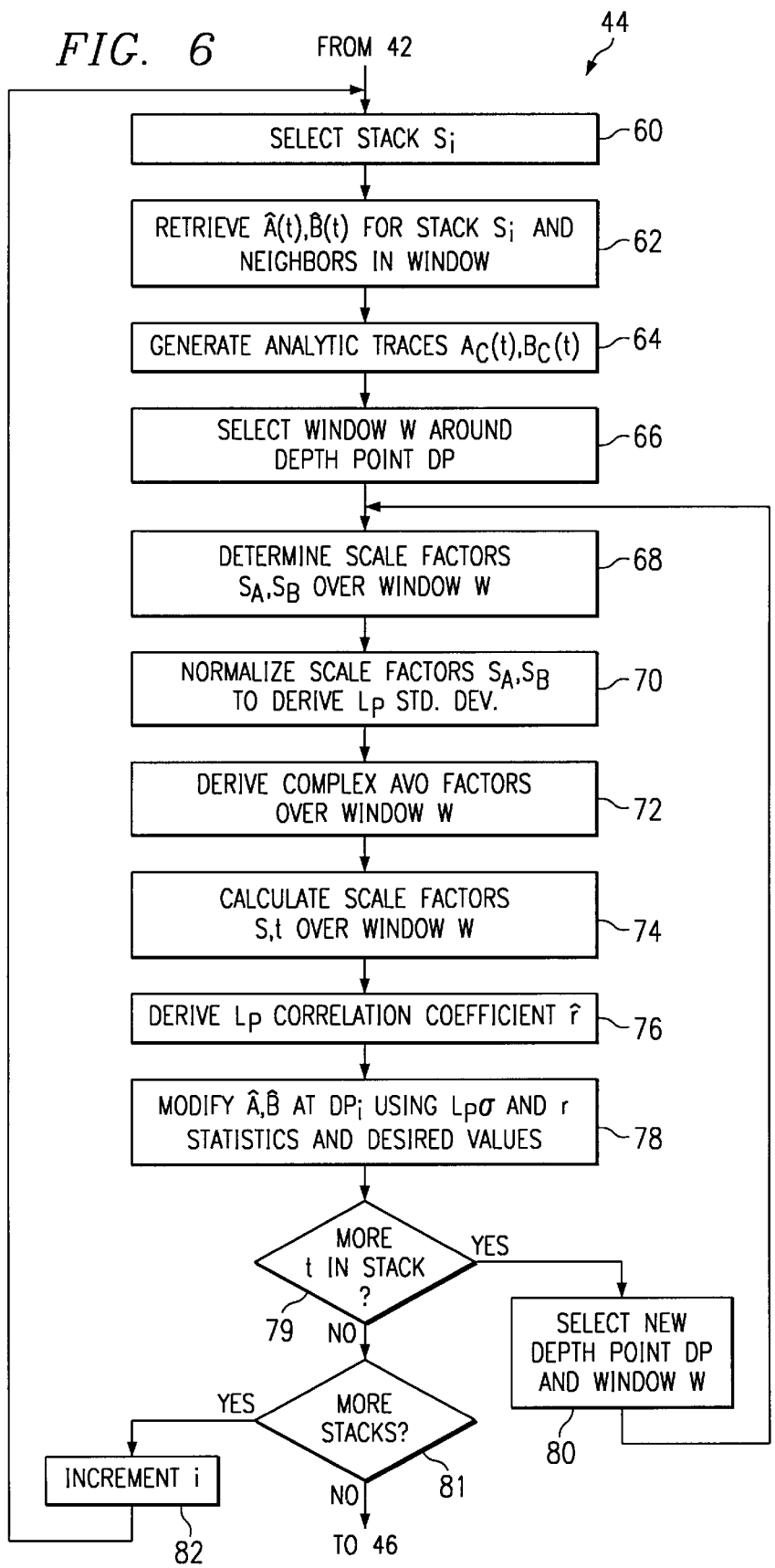
FIG. 6 is a detailed flow chart illustrating the operation of the correction process according to the preferred embodiment of the invention.

Referring now to FIG. 6, the operation of system computer 30 in performing process 44 according to the preferred embodiment of the invention will now be described in detail. As shown in FIG. 6, process 44 begins with the selection, in process 60, of stack $S_i$ for analysis. As noted above, each stack $S_i$ in the survey section includes a pair of estimated AVO traces $\hat{A}(t)$, $\hat{B}(t)$, associated with a common midpoint (CMP) location in the survey. Accordingly, system computer 30 then performs process 62 to retrieve from memory these estimated AVO intercept trace $\hat{A}(t)$ and the estimated AVO slope traces $\hat{B}(t)$ both for the selected stack $S_i$, and also for certain neighboring stacks in a selected window over which the AVO processing will take place, as will be described hereinbelow.

Upon retrieval of the estimated intercept and slope traces in process 62, system computer 30 next performs process 64 to generate analytic or complex traces $A_c(t)$, $B_c(t)$, based upon the estimated intercept and slope traces $\hat{A}(t)$, $\hat{B}(t)$, for the selected stack $S_i$ and its neighbors that were retrieved in process 62. As described in the above-incorporated U.S. Pat. No. 5,515,335, process 64 derives analytic traces $A_c(t)$, $B_c(t)$ by adding the real trace (i.e., traces $\hat{A}(t)$ and $\hat{B}(t)$, respectively) to the square root of $-1$ times its Hilbert transform. The generation of analytic traces $A_c(t)$, $B_c(t)$ is based upon the representation of seismic traces as the real part of the analytical or complex traces, as described in Taner, et al., "Complex Seismic Trace Analysis", *Geophysics*, Vol. 44, No. 6 (June 1979), pp. 1041–63.

Figure 7:
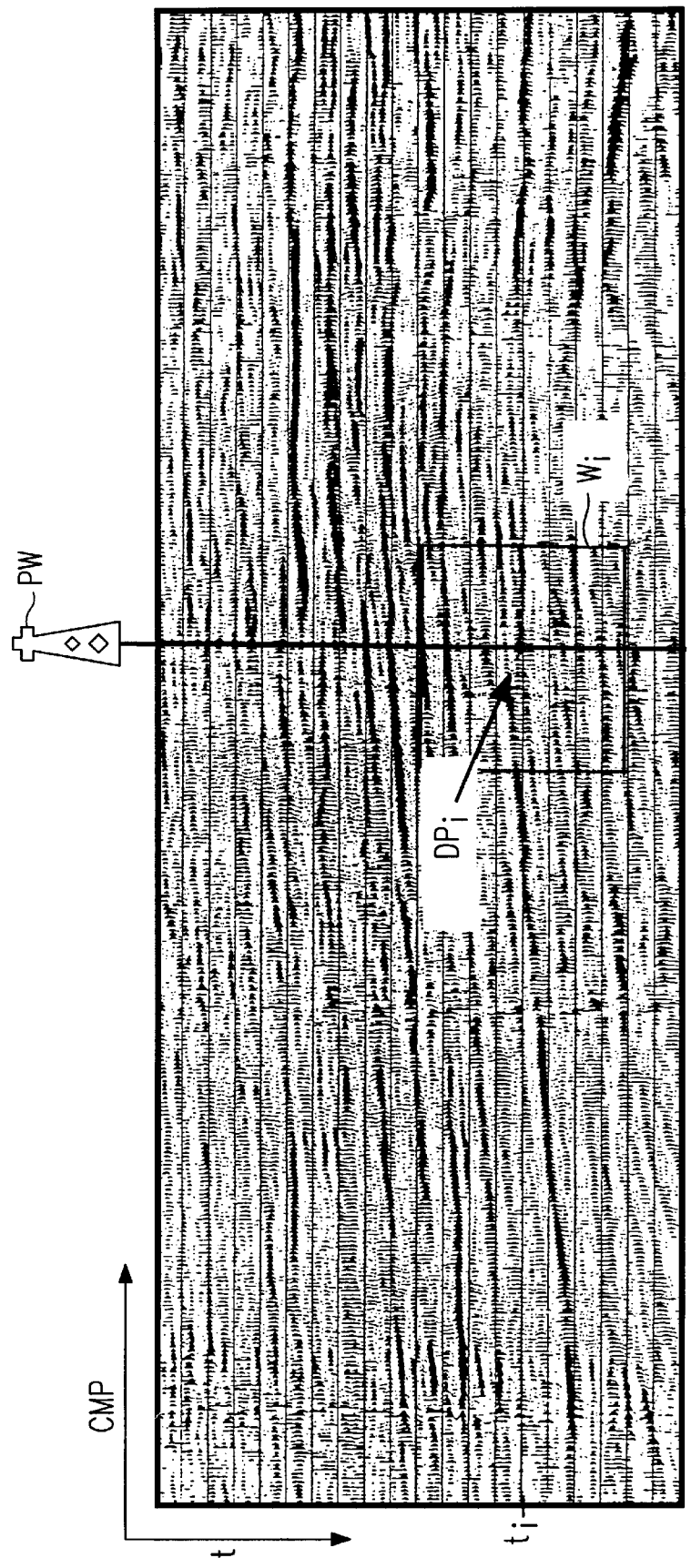
FIG. 7 is an exemplary illustration of AVO intercept traces for a series of CMP gathers in a typical survey section, illustrating the placement of a window about a depth point of interest therein.

The overburden correction analysis next proceeds as system computer 30 selects a window W around a depth point of interest DP, in process 66. The window W selected in process 66 is preferably large enough so that a significant number of background points in A-B space are contained therewithin, but not so large as to defeat the ability to make spatially-varying corrections to the AVO traces. FIG. 7 is a qualitative example of the selection of window W surrounding depth point of interest DP (which is associated with travel time t', as shown) over the estimated AVO intercept traces Â(t). While not shown in FIG. 7, window W will similarly cover a similar region of estimated AVO slope traces B̂(t). Of course, the actual window W will be applied to analytic traces $A_c(t)$, $B_c(t)$ that are retrieved in process 62, and as such the actual window W selected in process 66 will include portions of both the real and imaginary parts of these analytic traces $A_c(t)$, $B_c(t)$. Furthermore, considering that system computer 30 is based upon digital system computer 22, each of the analytic traces $A_c(t)$, $B_c(t)$ will be represented as a sequence of discrete values, rather than as a time-continuous analog signal. In the example of FIG. 7, depth point of interest DP is a point, on stack $S_i$, that is associated with a common midpoint (CMP) location at potential well location PW. Of course, each stacked trace in FIG. 6 is associated with a different common midpoint CMP.

Following the selection of depth point DP and its surrounding window W, system computer 30 next performs process 68 to generate scale factors $S_A$, $S_B$ based upon the portions of the analytic traces $A_c(t)$, $B_c(t)$, respectively, within window W. According to the present invention, scale factors $S_A$, $S_B$ may be generated using any one of a number of statistics, including root-mean-square measures of the amplitudes, mean of the absolute value of standard deviations, median of the absolute value of the standard deviations, and the like). It has been found, however, that root-mean-square generation of scale factors $S_A$, $S_B$ will produce a correlation coefficient that is substantially identical to that obtained according to conventional overburden correction techniques, such as that described in the above-incorporated U.S. Pat. No. 5,515,335. While the median approach is more robust relative to outliers, ordering of the data is necessary in order to derive the median. As such, according to the preferred embodiment of the invention, the p-measure of the scales, which is an extension of the rms and mean scale measures, is utilized, as will now be described.

The p-measure applied by system computer 30 to each of the analytic trace values $A_c(t)$, $B_c(t)$ in window W, in process 68, generates scale factors $S_A$, $S_B$ as follows:

$$S_A = \left(\frac{1}{n}\sum_{j=1}^{n}|A_c(j)|^p\right)^{1/p}$$

$$S_B = \left(\frac{1}{n}\sum_{j=1}^{n}|B_c(j)|^p\right)^{1/p}$$

where j corresponds to the index of the depth points within window W. The summations are performed not only for stack S, but also for the neighboring stacks S in window W. In the generation of scale values $S_A$, $S_B$ using a p-measure value p of 1 corresponds to the mean absolute scale, while use of a p-measure value p of 2 corresponds to the rms scale. According to the preferred embodiment of the invention, the p-measure value p is set to a value less than one, such as below about 0.5; a particular example, as will be described below, utilized a p value of 0.2. While the use of a p-measure value p of less than one does not correspond to a valid or known mathematical norm, it has been observed, in connection with the present invention, that smaller values of p provide better estimates of the background correlation coefficient when anomalies are present. It has been observed, according to the preferred embodiment of the invention, that the expected value of the measured correlation coefficient asymptotically approaches a limiting value with smaller values of p-measure value p. However, the variance of the measured correlation coefficient increases as p-measure value p approaches zero. The optimal choice of p-measure value p represents a tradeoff between the insensitivity of the background measure to anomalies, and the statistical significance of the background measure. In practice, p-measure values p between 0.2 and 0.5 are contemplated to be quite reasonable.

Referring back to FIG. 6, system computer 30 next performs process 70 to normalize the scale factors $S_A$, $S_B$ to obtain estimates of the standard deviations of complex AVO traces $A_c(t)$, $B_c(t)$, using the p-measure; such standard deviation estimates are referred to in the art as $L_p$ estimates of the standard deviations. According to the preferred embodiment of the invention, process 70 generates estimated $L_p$ standard deviations ($\hat{\sigma}_A$, $\hat{\sigma}_B$ of the analytical AVO traces $\hat{A}_c(t)$, $B_c(t)$ within window W based on the following definitions:

$$\hat{\sigma}_A = \frac{S_A^2}{\left[\Gamma\left(1+\frac{p}{2}\right)\right]^{2/p}}$$

$$\hat{\sigma}_B = \frac{S_B^2}{\left[\Gamma\left(1+\frac{p}{2}\right)\right]^{2/p}}$$

where $\Gamma$ is the gamma function. In the event that p-measure value p equals 2, these representations of standard deviations $\hat{\sigma}_A$, $\hat{\sigma}_B$ match the conventional definitions of standard deviations $\sigma_a$, $\sigma_b$ set forth above in the Background of the Invention, since $\Gamma(2)=1$. Furthermore, a purely Gaussian distribution (i.e., with no outliers) will yield $L_p$ standard deviations $\hat{\sigma}_A$, $\hat{\sigma}_B$ that are independent of p-measure value p, for $0 \leq p \leq 2$. It is contemplated that system computer 30 is capable of calculating estimated $L_p$ standard deviations $\hat{\sigma}_A$, $\hat{\sigma}_B$ using conventional numerical techniques.

In process 74, system computer 30 next performs process 72 to derive certain complex quantities used in the generation of additional scale factors that are representative of the semi-major and semi-minor axes of the background distribution of AVO data within window W. These complex quantities $P_+$, $P_-$, $Q_+$, $Q_-$ are derived for each depth point, on each stack S, within window W, as follows:

$$P_+ = \frac{A_c}{S_A} + \frac{B_c}{S_B}$$

$$P_- = \frac{A_c}{S_A} + \frac{B_c}{S_B}$$

$$Q_+ = \frac{A_c}{S_A} + i\frac{B_c}{S_B}$$

$$Q_- = \frac{A_c}{S_A} - i\frac{B_c}{S_B}$$

As a result, a window of values $P_+$, $P_-$, $Q_+$, $Q_-$ is generated for window W. These values are then used by system computer 30 in process 74 to derive a second set of scale factors, as will now be described.

In process 74, a second pass through window W (indeed, through the window of values $P_+$, $P_-$, $Q_+$, $Q_-$ associated therewith) is performed by system computer 30, to generate scale factors $s_+$, $s_-$, $t_+$, $t_-$, defined as follows:

$$s_+ = \left(\sum_{j=1}^{n} \frac{|P_+(j)|^p}{n}\right)^{1/p}$$

$$s_- = \left(\sum_{j=1}^{n} \frac{|P_-(j)|^p}{n}\right)^{1/p}$$

$$t_+ = \left(\sum_{j=1}^{n} \frac{|Q_+(j)|^p}{n}\right)^{1/p}$$

$$t_- = \left(\sum_{j=1}^{n} \frac{|Q_-(j)|^p}{n}\right)^{1/p}$$

The above summations, which are performed by system computer 30 in process 74 to generate scale factors $s_+$, $s_-$, $t_+$, $t_-$, are again performed over the entire window W.

According to the preferred embodiment of the invention, system computer 30 next calculates correlation coefficient $\hat{r}$ using scale factors $s_+$, $s_-$, $t_+$, $t_-$, in process 76. This calculation preferably follows:

$$\hat{r} = \frac{s_+ - s_-}{s_+ + s_-} + i\frac{t_+ - t_-}{t_+ + t_-}$$

In effect, correlation coefficient $\hat{r}$ corresponds to the complex ratio of the lengths of the semi-major and semi-minor axes of the background distribution of AVO intercept and slope values (stacked and filtered as noted above), in window W.

Once the correlation coefficient $\hat{r}$ is derived by system computer 30 in process 76, correction of the analytical AVO intercept and slope traces $A_c(t)$, $B_c(t)$, at the depth point of interest DP, is now made by system computer 30 in process 78. According to the preferred embodiment of the invention, the new values for analytical AVO traces $A_c(t)$, $B_c(t)$ at this point are based upon desired statistics $\sigma_a^d$, $\sigma_b^d$ and $r_d$. As in conventional overburden correction techniques, such as described in the above-incorporated U.S. Pat. No. 5,515,335, these desired statistics are selected based upon intuitive assumptions, or upon previous analysis of the portion of the earth being surveyed, so as to render the background statistics uniform over the survey section. According to the preferred embodiment of the invention, modified values $A_m(t)$, $B_m(t)$ are generated by system computer 30 in process 78 according to the following relationships:

$$A_m(t) = \frac{\sigma_a^d}{\hat{\sigma}_a} A_c(t)$$

$$B_m(t) = \sigma_b^d \left(\frac{B_c(t)}{\hat{\sigma}_b} - \hat{r}\frac{A_c(t)}{\hat{\sigma}_a}\right) \sqrt{\frac{1-r_d^2}{1-|\hat{r}|^2}} + \frac{\sigma_b^d}{\hat{\sigma}_a} r_d A_c(t)$$

In effect, the modifications performed by process 78 correspond to those made according to conventional approaches, except that the $L_p$ statistics $\hat{\sigma}_A$, $\hat{\sigma}_B$, $\hat{r}$ are used. Especially in the case when the value of power p is less than one, as is utilized according to the preferred embodiment of the invention, the $L_p$ statistics permit accurate matching of background statistics with minimal effect from the AVO anomalies (and thus provide a more accurate correction of the interesting character of these points, in the hydrocarbon exploration sense).

System computer 30 then determines whether window W ought to be slid in the time direction, according to this embodiment of the invention; if so (decision 79 is YES), a new depth point DP and window W is selected for stack $S_i$ and its neighboring traces as retrieved in process 62, and the overburden correction of processes 68 et seq. is repeated for this new window W. On the other hand, if stack $S_i$ has been completely processed (decision 79 is NO), system computer 30 next determines if additional stacks S in the survey section remain to be processed. If so (decision 81 is YES), process 82 increments the stack index i, a new stack is selected in process 60, and the overburden correction operation is repeated. Upon completion of all depth points in all stacks in the survey section (decision 81 is NO), overburden correction is complete for the survey section under analysis, and control passes to process 46 of FIG. 5. Of course, the sliding of windows W over the survey section may alternatively be performed in a different direction (e.g., by first changing stacks and then moving in time), with equivalent results, if desired.

Once overburden correction has been performed for the survey section, system computer 30 may now generate the desired AVO indicators, in process 46. As described in U.S. Pat. No. 5,661,697, and in copending applications Ser. No. 08/614,744, filed Mar. 13, 1996 and Ser. No. 08/654,258, filed May 28, 1996, all of which are incorporated by reference into this specification, and also as is known in the AVO analysis art, many different types of AVO indicators are used in seismic surveys. For example, as described in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92, incorporated herein by this reference, one simple AVO indicator is the function $f(A,B) = AB^*$, by way of which the AVO intercept value A and the complex conjugate AVO slope value $B^*$ at each point in the survey are multiplied, and the real part $\text{Re}\{AB^*\}$ of this product is retrieved and plotted as an AVO indicator. The above-incorporated U.S. Pat. No. 5,661,697 describes another AVO indicator which maps each point from A-B space into A-$\Delta$B space, where the value $\Delta$B corresponds to the distance, in the B direction, of the point in A-B space from a trend line defined by the background distribution. Above-incorporated copending application Ser. No. 08/614,744 describes another AVO indicator referred to as $\Delta(AB^*)$, and which corresponds to the rate of change of the product $AB^*$ along the direction of a deviation vector ($\Delta A$, $\Delta B$) from the background trend line toward the point in the A-B plane. Furthermore, as described in above-incorporated copending application Ser. No. 08/654,258, any one of the foregoing AVO indicators may be combined, for each point, with the percentile contour of its location relative to the background trend, to identify depth points that are both of petrophysical interest and that are also outside of the trend with some statistical certainty. According to the preferred embodiment of the present invention, an AVO indicator of one of these types, or of another AVO type, are generated by system computer 30 in process 46, and stored in computer memory in association with the depth point and CMP location associated therewith.

It is contemplated that some of the AVO indicators noted above may require additional processing prior to assignment of the AVO indicator values; this processing may, if appropriate, be combined with overburden correction process 44 according to the preferred embodiment of the invention, if desired or necessary.

System computer 30 next performs process 48 to identify those survey points having an AVO indicator value that meets certain criteria as previously defined by the analyst or analysis program. For example, as described in the above-incorporated U.S. Pat. No. 5,661,697, polygonal regions may be defined in certain ones of the quadrants of A-ΔB space, such that any points falling within the polygons are identified as potentially interesting from a hydrocarbon prospecting standpoint. System computer 30 then generates the appropriate AVO survey output in process 50, by way of a color plot on graphics display 27, printer 28, or other device. The survey results may instead or additionally be stored in disk storage 29, as desired.

Figure 1C:
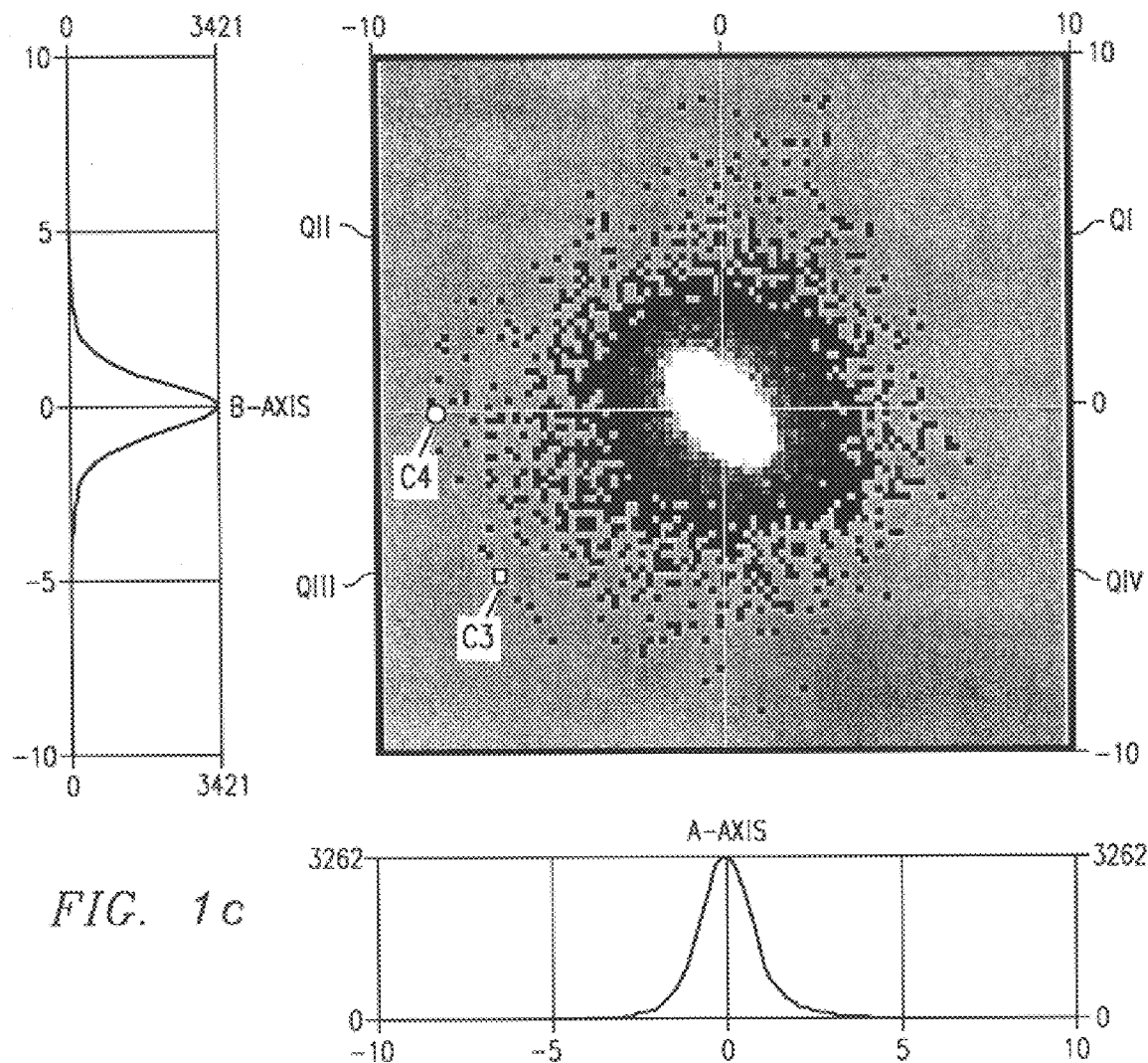
FIG. 1c is an AVO cross-plot of the population of FIGS. 1a and 1b, after completion of correction according to the preferred embodiment of the invention.
Figure 3C:
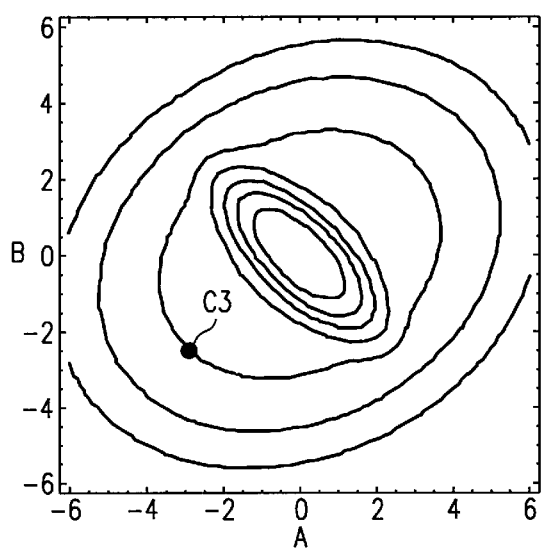

Referring now to FIGS. 3c and 1c, an example of the beneficial results of the preferred embodiment of the present invention will now be described. FIG. 3c presents a contour plot, in A-B space, of the cross-plotted population of FIG. 1a, after the performing of overburden correction process 44 using a p value of 0.2, and a desired correlation coefficient of −0.6 (as in the case of FIG. 3b). Comparison of the contours of FIG. 3c, which again correspond to the 0.1, 0.03, 0.01, 0.003, 0.001, 0.0003, and 0.0001 probability levels (outward from the origin), to FIG. 3b illustrates that the background statistics (e.g., within the 0.003 probability contour), have their correlation coefficient reinforced, but that outliers such as point C3 are not affected by the corrections of process 44. The measured $L_p$ correlation coefficient for the background in this example was approximately −0.5. As is evident from FIG. 3c, the outlier distribution (i.e., Distribution 2 of the jointly Gaussian distribution) maintains its positive correlation in A-B space, such correlation not being distorted as can result from conventional overburden correction as illustrated in FIG. 3b.

FIG. 1c illustrates the cross-plot, in A-B space, of the same population as described above relative to FIGS. 1a and 1b, but after the modification of the A and B AVO values according to the overburden correction process 44 according to the preferred embodiment of the invention; the cross-plot of FIG. 1c corresponds to the contours of FIG. 3c, in which the desired correlation coefficient −0.6 and a p value of 0.2 were used. As evident from FIG. 1c, especially in comparison with FIG. 1b which resulted from the conventional processing, the negative correlation of the background points near the origin of the cross-plot is maintained, but AVO anomalies C3, C4 are not significantly shifted from their raw positions of FIG. 1a which, in this case, is the correct result Accordingly, the present invention provides the important advantages of correcting AVO seismic survey signals for offset-dependent effects, such as may be caused by overburden layers, so that the background statistics over the entire survey section conform to known trends, and in so doing, move the AVO intercept and slope to their proper locations in A-B space. This correction is effected in a manner that is relatively immune to the presence of AVO outliers, or anomalous points, of the type that have potential importance in the detection of oil and gas reserves. Because of the present invention, it is contemplated that the risk of missing large AVO anomalies in screening surveys is reduced; indeed, it is contemplated that the present invention will improve the ability of identifying AVO anomalies that are in close physical proximity to large background reflective interfaces. Furthermore, it is contemplated that the present invention permits measurement of rapid variations of the seismic background, as the window size necessary for overburden correction need not be as large as in conventional AVO processing. These advantages all contribute to improved correspondence between synthetic and seismic overburden-corrected AVO attributes, as is useful to the geologist.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to correct for offset-dependent effects in seismic survey signals, wherein the seismic survey signals comprise a plurality of series of time-based signals obtained at a plurality of detectors at the earth responsive to seismic energy imparted to the earth, the signals being gathered into gathers of seismic survey signals, each gather representative of energy reflected from depth points below a corresponding one of a plurality of surface locations at a plurality of angles of incidence, the method comprising the steps of processing the seismic signals in each of the gathers to produce a plurality of stacks, each associated with a location of the earth and each including an AVO intercept trace and an AVO slope trace;

for each of a plurality of windows, each window associated with a depth point of interest along a selected trace, including a plurality of neighboring traces to the selected trace, and covering a selected portion of the selected and neighboring traces, so that the window includes a plurality of depth points having AVO intercept and an AVO slope values associated therewith, performing the steps of:

determining a first pair of scale factors, including an AVO intercept scale factor and an AVO slope scale factor, corresponding to the $p^{th}$ root of a summation of the $p^{th}$ power of amplitudes of the AVO intercept and AVO slope values, respectively in the window, using a preselected value of p;

generating scaled standard deviations of the AVO intercept and an AVO slope traces over the window based upon the first pair of scale factors;

generating a group of quantities, for each depth point in the window, corresponding to scaled sums and differences of its AVO intercept and AVO slope values;

determining a second group of scale factors over the window, each scale factor corresponding to the $p^{th}$ root of a summation of the $p^{th}$ power of one of the group of quantities over the window;

generating a scaled correlation coefficient from the ratio of differences of the second group of scale factors to sums of the second group of scale factors; and modifying the AVO intercept and AVO slope values of the depth point of interest according to a relationship between the scaled correlation coefficient and scaled standard deviations to desired correlation coefficient and standard deviation values for the survey;

generating AVO indicators from the modified AVO intercept and AVO slope values; and outputting a survey using the AVO indicators.

2. The method of claim 1, wherein the preselected value of p is less than one.

3. The method of claim 1, further comprising:
generating analytical AVO intercept and AVO slope traces for the plurality of stacks;
wherein the generating steps are performed upon the analytical AVO intercept and AVO slope traces in the window.

4. The method of claim 3, wherein the step of generating a group of quantities comprises, for each depth point in the window:
generating a first quantity corresponding to a sum of the AVO intercept value of the depth point scaled by the AVO intercept scale factor, with the AVO slope value of the depth point scaled by the AVO slope scale factor;
generating a second quantity corresponding to a difference of the AVO intercept value of the depth point scaled by the AVO intercept scale factor, and the AVO slope value of the depth point scaled by the AVO slope scale factor;
generating a third quantity corresponding to a sum of the AVO intercept value of the depth point scaled by the AVO intercept scale factor, with the AVO slope value of the depth point scaled by the AVO slope scale factor times the imaginary operator; and
generating a fourth quantity corresponding to the complex conjugate of the third quantity.

5. The method of claim 4, wherein the step of generating the second group of scale factors generating first through fourth scale factors corresponding to the $p^{th}$ root of a summation of the $p^{th}$ power of the first through fourth quantities, respectively, over the window.

6. The method of claim 4, wherein the scaled correlation coefficient is in complex form.

7. The method of claim 6, wherein the step of generating the scaled correlation coefficient comprises:
adding the ratio of the difference between the first and second scale factors to the sum of the first and second scale factors, to the imaginary operator times the ratio of the difference between the third and fourth scale factors to the sum of the third and fourth scale factors.

8. A computer-readable memory having a storage medium configured so that, when read and used by a computer, the computer is directed to correct for offset-dependent effects in seismic survey signals, the seismic survey signals comprising a plurality of series of time-based signals obtained at a plurality of detectors at the earth responsive to seismic energy imparted to the earth, and gathered into gathers of seismic survey signals, each gather representative of energy reflected from depth points below a corresponding one of a plurality of surface locations at a plurality of angles of incidence, said computer directed by a plurality of operations comprising:
processing the seismic signals in each of the gathers to produce a plurality of stacks, each associated with a location of the earth and each including an AVO intercept trace and an AVO slope trace;
for each of a plurality of windows, each window associated with a depth point of interest along a selected trace, including a plurality of neighboring traces to the selected trace, and covering a selected portion of the selected and neighboring traces, so that the window includes a plurality of depth points having AVO intercept and an AVO slope values associated therewith, performing the steps of:
determining a first pair of scale factors, including an AVO intercept scale factor and an AVO slope scale factor, corresponding to the $p^{th}$ root of a summation of the $p^{th}$ power of amplitudes of the AVO intercept and AVO slope values, respectively, in the window, using a preselected value of p;
generating scaled standard deviations of the AVO intercept and an AVO slope traces over the window based upon the first pair of scale factors;
generating a group of quantities, for each depth point in the window, corresponding to scaled sums and differences of its AVO intercept and AVO slope values;
determining a second group of scale factors over the window, each scale factor corresponding to the $p^{th}$ root of a summation of the $p^{th}$ power of one of the group of quantities over the window;
generating a scaled correlation coefficient from the ratio of differences of the second group of scale factors to sums of the second group of scale factors; and
modifying the AVO intercept and AVO slope values of the depth point of interest according to a relationship between the scaled correlation coefficient and scaled standard deviations to desired correlation coefficient and standard deviation values for the survey;
generating AVO indicators from the modified AVO intercept and AVO slope values; and
outputting a survey using the AVO indicators.

9. The computer-readable memory of claim 8, wherein the preselected value of p is less than one.

10. The computer-readable memory of claim 8, wherein the plurality of operations further comprises:
generating analytical AVO intercept and AVO slope traces for the plurality of stacks;
wherein the generating steps are performed upon the analytical AVO intercept and AVO slope traces in the window.

11. The computer-readable memory of claim 10, wherein the step of generating a group of quantities comprises, for each depth point in the window:
generating a first quantity corresponding to a sum of the AVO intercept value of the depth point scaled by the AVO intercept scale factor, with the AVO slope value of the depth point scaled by the AVO slope scale factor;
generating a second quantity corresponding to a difference of the AVO intercept value of the depth point scaled by the AVO intercept scale factor, and the AVO slope value of the depth point scaled by the AVO slope scale factor;
generating a third quantity corresponding to a sum of the AVO intercept value of the depth point scaled by the AVO intercept scale factor, with the AVO slope value of the depth point scaled by the AVO slope scale factor times the imaginary operator; and
generating a fourth quantity corresponding to the complex conjugate of the third quantity.

12. The computer-readable memory of claim 11, wherein the step of generating the second group of scale factors generating first through fourth scale factors corresponding to the $p^{th}$ root of a summation of the $p^{th}$ power of the first through fourth quantities, respectively, over the window.

13. The computer-readable memory of claim 11, wherein the scaled correlation coefficient is in complex form.

14. The computer-readable memory of claim 13, wherein the step of generating the scaled correlation coefficient comprises:
adding the ratio of the difference between the first and second scale factors to the sum of the first and second scale factors, to the imaginary operator times the ratio of the difference between the third and fourth scale factors to the sum of the third and fourth scale factors.

15. A digital computing system for analyzing seismic survey signals to distinguish the presence of sand formations in a region of the earth corresponding to the seismic survey signals, comprising:

a memory for storing data corresponding to a plurality of series of tie-based signals obtained at a plurality of detectors at the earth responsive to seismic energy imparted to the earth and gathered into gathers of seismic survey signals, each gather representative of energy reflected from depth points below a corresponding one of a plurality of surface locations at a plurality of angles of incidence;

a computer system output device; and a programmed computer, coupled to the memory and to the output device, for:

retrieving, from the memory, digital data corresponding to the plurality of gathers;

processing the seismic signals in each of the gathers to produce a plurality of stacks, each associated with a location of the earth and each including an AVO intercept trace and an AVO slope trace;

for each of a plurality of windows, each window associated with a depth point of interest along a selected trace, including a plurality of neighboring traces to the selected trace, and covering a selected portion of the selected and neighboring traces, so that the window includes a plurality of depth points having AVO intercept and an AVO slope values associated therewith, performing the steps of:

determining a first pair of scale factors, including an AVO intercept scale factor and an AVO slope scale factor, corresponding to the $p^{th}$ root of a summation of the $p^{th}$ power of amplitudes of the AVO intercept and AVO slope values, respectively in the window, using a preselected value of p;

generating scaled standard deviations of the AVO intercept and an AVO slope traces over the window based upon the first pair of scale factors;

generating a group of quantities, for each depth point in the window, corresponding to scaled sums and differences of its AVO intercept and AVO slope values;

determining a second group of scale factors over the window, each scale factor corresponding to the $p^{th}$ root of a summation of the $p^{th}$ power of one of the group of quantities over the window;

generating a scaled correlation coefficient from the ratio of differences of the second group of scale factors to sums of the second group of scale factors; and modifying the AVO intercept and AVO slope values of the depth point of interest according to a relationship between the scaled correlation coefficient and scaled standard deviations to desired correlation coefficient and standard deviation values for the survey;

generating AVO indicators from the modified AVO intercept and AVO slope values; and outputting, to the output device, a survey based upon the AVO indicators.

16. The system of claim 15, wherein the preselected value of p is less than one.

17. The system of claim 15, wherein the computer is also for:

generating analytical AVO intercept and AVO slope traces for the plurality of stacks;

wherein the generating steps are performed upon the analytical AVO intercept and AVO slope traces in the window.

18. The system of claim 17, wherein the computer is programmed to generate the group of quantities by performing a sequence of steps that comprises, for each depth point in the window:

generating a first quantity corresponding to a sum of the AVO intercept value of the depth point scaled by the AVO intercept scale factor, with the AVO slope value of the depth point scaled by the AVO slope scale factor;

generating a second quantity corresponding to a difference of the AVO intercept value of the depth point scaled by the AVO intercept scale factor, and the AVO slope value of the depth point scaled by the AVO slope scale factor;

generating a third quantity corresponding to a sum of the AVO intercept value of the depth point scaled by the AVO intercept scale factor, with the AVO slope value of the depth point scaled by the AVO slope scale factor times the imaginary operator; and generating a fourth quantity corresponding to the complex conjugate of the third quantity.

19. The system of claim 18, wherein the step of generating the second group of scale factors generating first through fourth scale factors corresponding to the pi root of a summation of the $p^{th}$ power of the first through fourth quantities, respectively, over the window.

20. The system of claim 18, wherein the scaled correlation coefficient is in complex form;

and wherein the computer is programmed to generate the scaled correlation coefficient by a sequence of operations comprising:

adding the ratio of the difference between the first and second scale factors to the sum of the first and second scale factors, to the imaginary operator times the ratio of the difference between the third and fourth scale factors to the sum of the third and fourth scale factors.

* * * * *

UNITED STATES PATENT AND TRADEMARK OFFICE
CERTIFICATE OF CORRECTION

PATENT NO. : 6,058,074
DATED : May 2, 2000
INVENTOR(S) : Herbert W. Swan, Bruce J. Verwest Page 1 of 4

It is certified that error appears in the above-identified patent and that said Letters Patent is hereby corrected as shown below:

| Col. | Line | |
|---|---|---|
| 1 | 51 | "midpoint (SAP) gather." <br><br> should read: <br> "midpoint (CMP) gather." |
| 6 | 20 | "a correlation coefficient" <br><br> should read: <br> "a correlation coefficient." |
| 8 | 18 | "earth" <br><br> should read: <br> "earth." |
| 8 | 36 | "where - is the fraction" <br><br> should read: <br> "where $\eta$ is the fraction" |

UNITED STATES PATENT AND TRADEMARK OFFICE
CERTIFICATE OF CORRECTION

PATENT NO. : 6,058,074
DATED : May 2, 2000
INVENTOR(S) : Herbert W. Swan, Bruce J. Verwest It is certified that error appears in the above-identified patent and that said Letters Patent is hereby corrected as shown below:

| Col. | Line | | |
|------|------|---|---|
| 8 | 59 | "positive correlation" | should read: "positive correlation." |
| 8 | 65 | "correlation coefficient" | should read: "correlation coefficient." |
| 9 | 43 | "coefficient, in effect," | should read: "coefficient; in effect," |
| 11 | 46 | "by the analyst" | should read: "by the analyst." |

UNITED STATES PATENT AND TRADEMARK OFFICE
CERTIFICATE OF CORRECTION

PATENT NO. : 6,058,074
DATED : May 2, 2000
INVENTOR(S) : Herbert W. Swan, Bruce J. Verwest It is certified that error appears in the above-identified patent and that said Letters Patent is hereby corrected as shown below:

| Col. | Line | |
|------|------|---|
| 12 | 52 | "slope traces"<br><br>should read:<br>"slope trace" |
| 12 | 65 | "$A_c(t)$, $B,(t)$"<br><br>should read:<br>"$A_c(t)$, $B_c(t)$" |
| 13 | 61 | "stack S, but also"<br><br>should read:<br>"stack $S_i$, but also" |
| 14 | 24 | "deviations ($\hat{\sigma}A, \hat{\sigma}B$"<br><br>should read:<br>"deviations $\hat{\sigma}A, \hat{\sigma}B$" |

UNITED STATES PATENT AND TRADEMARK OFFICE
CERTIFICATE OF CORRECTION

PATENT NO. : 6,058,074
DATED : May 2, 2000
INVENTOR(S) : Herbert W. Swan, Bruce J. Verwest It is certified that error appears in the above-identified patent and that said Letters Patent is hereby corrected as shown below:

| Col. | Line | |
|------|------|---|
| 17 | 51 | "correct result"<br><br>should read:<br>"correct result." |
| 18 | 27 | "comprising the steps of"<br><br>should read:<br>"comprising the steps of:" |
| 22 | 40 | "to the pi root"<br><br>should read:<br>"to the $p^{th}$ root" |

Signed and Sealed this

Tenth Day of April, 2001

Attest:

NICHOLAS P. GODICI

Attesting Officer     Acting Director of the United States Patent and Trademark Office